US012358528B2

United States Patent
Molinari et al.

(10) Patent No.: US 12,358,528 B2
(45) Date of Patent: Jul. 15, 2025

(54) PRODUCING A TRAJECTORY FROM A DIVERSE SET OF POSSIBLE MOVEMENTS

(71) Applicant: Toyota Research Institute, Inc., Los Altos, CA (US)

(72) Inventors: Daniele Molinari, Redwood City, CA (US); Ryan J. Marcotte, Ann Arbor, MI (US); Harsh Virendra Pandya, Sunnyvale, CA (US); Constantin Franziskus Dominik Hubmann, Menlo Park, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 301 days.

(21) Appl. No.: 17/729,637

(22) Filed: Apr. 26, 2022

(65) Prior Publication Data
US 2023/0339503 A1 Oct. 26, 2023

(51) Int. Cl.
*B60W 60/00* (2020.01)
*B60W 40/04* (2006.01)

(52) U.S. Cl.
CPC ........ *B60W 60/0011* (2020.02); *B60W 40/04* (2013.01); *B60W 60/00274* (2020.02);
(Continued)

(58) Field of Classification Search
CPC ....... B60W 60/0011; B60W 60/00274; B60W 40/04; B60W 2554/20; B60W 2552/53; B60W 2554/80; B60W 2554/4045
(Continued)

(56) References Cited

U.S. PATENT DOCUMENTS 10,012,991 B1 * 7/2018 Ferguson ............... B60W 40/04
10,671,076 B1 * 6/2020 Kobilarov ............... G08G 1/166
(Continued)

FOREIGN PATENT DOCUMENTS

CN 112733908 A 4/2021
DE 102018130154 A1 * 6/2019 ............ B60W 30/10

OTHER PUBLICATIONS

English Translation of DE-102018130154-A1.*
(Continued)

*Primary Examiner* — Russell Frejd
*Assistant Examiner* — Preston Jay Miller
(74) *Attorney, Agent, or Firm* — Christopher G. Darrow; Darrow Mustafa PC

(57) ABSTRACT

A system for producing a trajectory from a diverse set of possible movements can include a processor and a memory. The memory can store a possible movement production module and a trajectory production module. The possible movement production module can include instructions that cause the processor to: (1) produce a set of possible movements of a mobile robot with respect to a challenge, (2) determine a measure of diversity between a first possible movement and a second possible movement, and (3) produce a subset. Measures of diversity associated with possible movements included in the subset can be larger than measures of diversity associated with possible movements excluded from the subset. The trajectory production module can include instructions that cause the processor to: (1) produce trajectories associated with the possible movements included in the subset and (2) cause the mobile robot to move according to one of the trajectories.

21 Claims, 6 Drawing Sheets

(52) U.S. Cl.
CPC ..... *B60W 2552/53* (2020.02); *B60W 2554/20* (2020.02); *B60W 2554/4045* (2020.02); *B60W 2554/80* (2020.02)

(58) Field of Classification Search
USPC .......................................................... 701/23
See application file for complete search history.

(56) References Cited

U.S. PATENT DOCUMENTS

| | | | | |
|---|---|---|---|---|
| 11,999,380 | B1* | 6/2024 | Funke | B60W 60/0011 |
| 2014/0074388 | A1* | 3/2014 | Bretzigheimer ... | B62D 15/0275 701/117 |
| 2018/0284785 | A1* | 10/2018 | Berntorp | G08G 1/166 |
| 2020/0117207 | A1* | 4/2020 | Zhang | B60W 60/001 |
| 2020/0174481 | A1* | 6/2020 | Van Heukelom .. | G01C 21/3407 |
| 2020/0249674 | A1* | 8/2020 | Dally | G05D 1/0221 |
| 2021/0064044 | A1* | 3/2021 | Refaat | G05D 1/0219 |
| 2021/0138644 | A1* | 5/2021 | Zhang | B25J 13/089 |
| 2021/0163038 | A1 | 6/2021 | Huang et al. | |
| 2021/0188316 | A1* | 6/2021 | Marchetti-Bowick | ...................... G06N 3/045 |
| 2021/0253128 | A1* | 8/2021 | Nister | B60W 60/0027 |
| 2021/0271245 | A1* | 9/2021 | Bradley | G05D 1/227 |
| 2021/0403045 | A1* | 12/2021 | Lin | G08G 1/166 |
| 2022/0032952 | A1* | 2/2022 | Lienke | B60W 60/001 |
| 2022/0066460 | A1* | 3/2022 | Ivanovic | G06N 3/044 |
| 2022/0126861 | A1* | 4/2022 | Yamada | B60W 60/0027 |
| 2022/0176995 | A1* | 6/2022 | Subramanian | B60W 30/08 |

OTHER PUBLICATIONS

Takayuki Oka, "Motion Planning by Learning the Solution Manifold in Trajectory Optimization," Jul. 13, 2021, pp. 1-24.

Fraile et al., "Vehicle Trajectory Approximation and Classification," British Machine Vision Conference Proceedings, pp. 832-840.

Branicky et al., "Path and Trajectory Diversity: Theory and Algorithm," IEEE International Conference on Robotics and Automation, 2008, pp. 1359-1364.

Park et al., "Diverse and Admissible Trajectory Forecasting through Multimodal Context Understanding," Computer Vision—ECCV 2020, Lecture Notes in Computer Science, vol. 12356, pp. 282-298.

Sharma et al., "Towards Generating Diverse Topologies of Path Tracing Compliant Mechanisms Using a Local Search Based Multi-Objective Genetic Algorithm Procedure," 2008 IEEE Congress on Evolutionary Computation, 2008, pp. 2004-2011.

Lupu et al., "Trajectory Diversity for Zero-Shot Coordination," AAMAS '21: Proceedings of the 20th International Conference on Autonomous Agents and MultiAgent Systems, May 3, 2021, pp. 1593-1595.

\* cited by examiner

| | Possible Movement | | | |
|---|---|---|---|---|
| | #1 | #2 | #3 | #4 |
| Degree of Change of Direction | 0° | 30° | 30° | 90° |
| Rate of Change of Direction | 0°/s | 15°/s | 15°/s | 9°/s |
| Distance to Commencement of Change of Direction | 0 m | 0 m | 0 m | 50 m |
| Duration of Time Until Commencement of Change of Direction | 0 s | 0 s | 0 s | 6 s |
| Distance to Completion of Change of Direction | 0 m | 20 m | 40 m | 60 m |
| Duration of Time Until Completion of Change of Direction | 0 s | 2 s | 4 s | 16 s |
| Count of Changes of Directions | 0 | 1 | 2 | 2 |
| Magnitude of Change of Speed | 800 m/m | 200 m/m | 200 m/m | 600 m/m |
| Rate of Change of Speed | 6.7 m/s | 10 m/s | 10 m/s | 10 m/s |
| Distance to Commencement of Change of Speed | 0 m | 0 m | 0 m | 50 m |
| Duration of Time Until Commencement of Change of Speed | 0 s | 0 s | 0 s | 6 s |
| Distance to Completion of Change of Speed | 100 m | 20 m | 40 m | 60 m |
| Duration of Time Until Completion of Change of Speed | 15 s | 2 s | 4 s | 16 s |
| Count of Changes of Speeds | 1 | 2 | 4 | 4 |

| Diversity of Change of Direction | #1 | #2 | #3 | #4 |
|---|---|---|---|---|
| #4 | 90° | 60° | 60° | 0° |
| #3 | 30° | 0° | 0° | |
| #2 | 30° | 0° | | |
| #1 | 0° | | | |

404

| Diversity of Change of Speed | #1 | #2 | #3 | #4 |
|---|---|---|---|---|
| #4 | 200 m/m | 400 m/m | 400 m/m | 0 m/m |
| #3 | 600 m/m | 0 m/m | 0 m/m | |
| #2 | 600 m/m | 0 m/m | | |
| #1 | 0 m/m | | | |

FIG. 4

PRODUCING A TRAJECTORY FROM A DIVERSE SET OF POSSIBLE MOVEMENTS

TECHNICAL FIELD

The disclosed technologies are directed to producing a trajectory from a diverse set of possible movements.

BACKGROUND

An automated motion technology system can be used to cause a mobile robot to move independently in an environment with one or more challenges. Such an automated motion technology system can be arranged to perform functions in stages. Such stages can include, for example, a sensing stage, a perception stage, and a decision stage.

The sensing stage can include technologies through which the mobile robot can detect, for example, information about the one or more challenges in the environment and/or information about a location and/or a movement of the mobile robot.

The perception stage can perform functions on information from the sensing stage to produce information that facilitates a better understanding of the environment of the mobile robot. Such functions can include, for example, localization of the mobile robot, recognition of the one or more challenges, and tracking a motion of the one or more challenges. Localization can include functions to determine a position of the mobile robot with a margin of error of less than a decimeter.

The decision stage can perform functions on information from the perception stage to produce, by a possible movement production system, a set of possible movements of the mobile robot with respect to the one or more challenges. A possible movement can include general information about a possible path of travel of the mobile robot.

The decision stage can perform functions on information from the possible movement production system to produce, by a trajectory production system, trajectories associated with the possible movements included in the set of possible movements. A trajectory can include specific information, often as a discretized representation that includes information about a sequence of one or more points, per unit of time or unit of space, along the possible path of travel of the mobile robot.

The decision stage can perform functions on information from the trajectory production system to produce, by a control system, a control signal to cause the mobile robot to move according to one of the trajectories. For example, the mobile robot can be an automated vehicle. For example, the control signal can be communicated via a controller area network (CAN) bus to one or more vehicle systems of the automated vehicle to realize movement of the automated vehicle according to the trajectory. The one or more vehicle systems can include, for example, a propulsion system, a braking system, a steering system, a throttle system, a transmission system, a signaling system, and/or a navigation system.

SUMMARY

In an embodiment, a system for producing a trajectory from a diverse set of possible movements can include a processor and a memory. The memory can store a possible movement production module and a trajectory production module. The possible movement production module can include instructions that, when executed by the processor, cause the processor to: (1) produce a set of possible movements of a mobile robot with respect to a challenge, (2) determine a measure of diversity between a first possible movement and a second possible movement, and (3) produce a subset. Measures of diversity associated with possible movements included in the subset can be larger than measures of diversity associated with possible movements excluded from the subset. The trajectory production module can include instructions that, when executed by the processor, cause the processor to: (1) produce trajectories associated with the possible movements included in the subset and (2) cause the mobile robot to move according to one of the trajectories.

In another embodiment, a method for producing a trajectory from a diverse set of possible movements can include producing, by a processor, a set of possible movements of a mobile robot with respect to a challenge. The method can include determining, by the processor, a measure of diversity between a first possible movement and a second possible movement. The method can include producing, by the processor, a subset. Measures of diversity associated with possible movements included in the subset can be larger than measures of diversity associated with possible movements excluded from the subset. The method can include producing, by the processor, trajectories associated with the possible movements included in the subset. The method can include causing, by the processor, the mobile robot to move according to one of the trajectories.

In another embodiment, a non-transitory computer-readable medium for producing a trajectory from a diverse set of possible movements can include instructions that, when executed by one or more processors, cause the one or more processors to produce a set of possible movements of a mobile robot with respect to a challenge. The non-transitory computer-readable medium can also include instructions that, when executed by one or more processors, cause the one or more processors to determine a measure of diversity between a first possible movement and a second possible movement. The non-transitory computer-readable medium can also include instructions that, when executed by one or more processors, cause the one or more processors to produce a subset. Measures of diversity associated with possible movements included in the subset can be larger than measures of diversity associated with possible movements excluded from the subset. The non-transitory computer-readable medium can also include instructions that, when executed by one or more processors, cause the one or more processors to produce trajectories associated with the possible movements included in the subset. The non-transitory computer-readable medium can also include instructions that, when executed by one or more processors, cause the one or more processors to cause the mobile robot to move according to one of the trajectories.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3 includes a chart that illustrates an example of values for parameters that define possible movements for a set of the possible movements illustrated in FIG. 1, according to the disclosed technologies.

FIG. 4 includes charts that illustrate examples of measures of diversity between pairs of possible movements of the possible movements illustrated in FIG. 1, according to the disclosed technologies.

DETAILED DESCRIPTION

Figure 1:
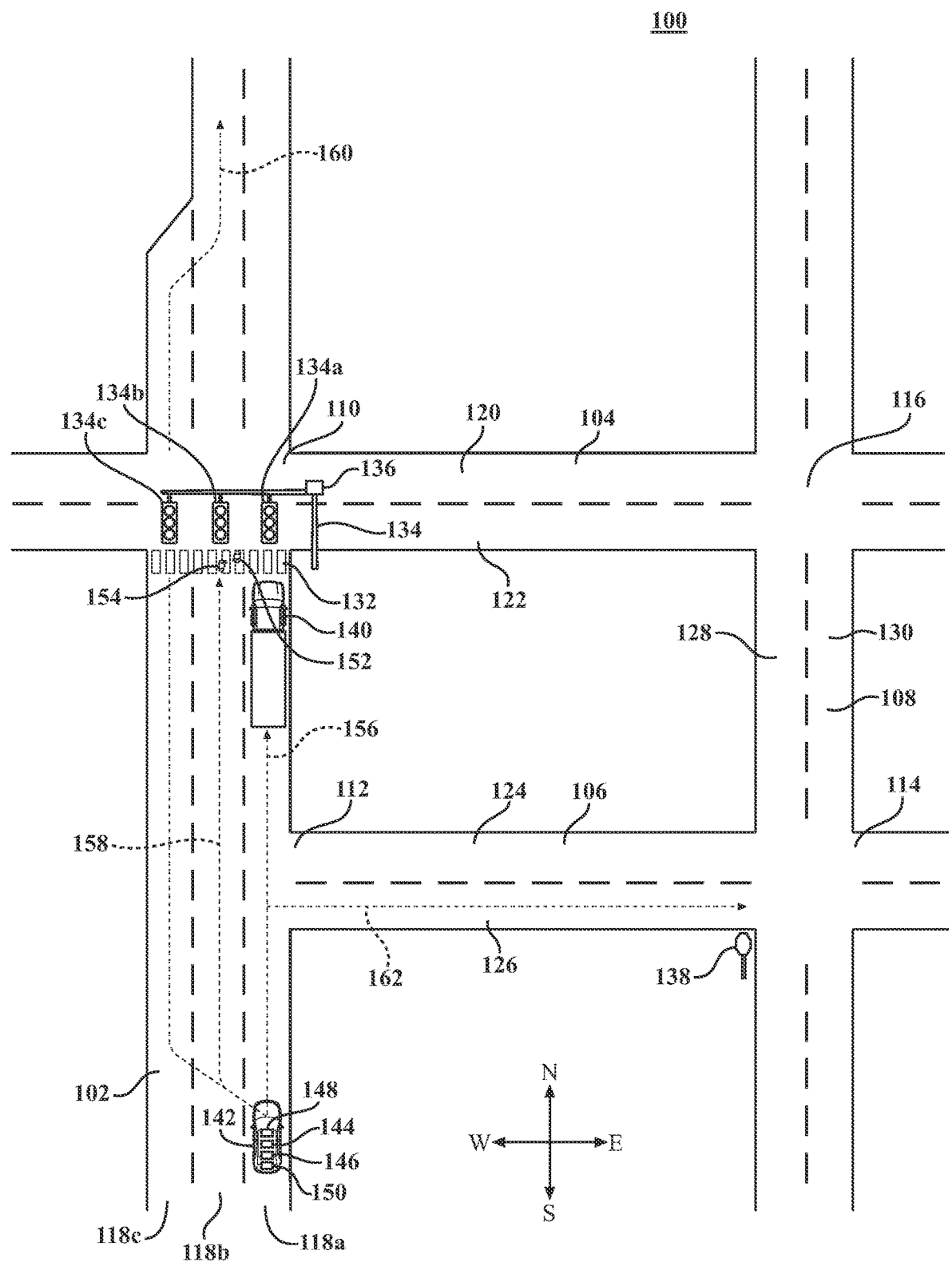
FIG. 1 includes a diagram that illustrates an example of an environment for producing a trajectory from a diverse set of possible movements, according to the disclosed technologies.

The disclosed technologies are directed to producing a trajectory from a diverse set of possible movements. A set of possible movements of a mobile robot with respect to a challenge can be produced. For example, the mobile robot can include an automated vehicle. For example, the challenge can be a physical impediment. The physical impediment can be capable of having an effect on a trajectory of the mobile robot. For example, the physical impediment can include one or more of a stationary object, a moving object, an end of a lane, or the like. For example, the challenge can be an object configured to have an effect on a trajectory of the mobile robot. For example, such an object can include one or more of a traffic light, a traffic sign, a roadside unit, or the like. For example, a possible movement can include general information about a possible path of travel of the mobile robot. For example, a possible movement can be defined by one or more parameters.

Conventionally, trajectories associated with the possible movements included in the set of possible movements can be produced. A trajectory can include specific information, often as a discretized representation that includes information about a sequence of one or more points, per unit of time or unit of space, along the possible path of travel of the mobile robot. Operations, to produce the trajectories associated with the possible movements included in the set of possible movements, may not be capable of being completed before a time at which a commencement of a movement of the mobile robot with respect to the challenge is needed. Therefore, the disclosed technologies are directed to producing a subset of possible movements so that operations, to produce the trajectories associated with the possible movements included in the subset of possible movements, can be capable of being completed before the time at which the commencement of the movement of the mobile robot with respect to the challenge is needed.

Because the disclosed technologies are directed to producing the trajectories associated with the possible movements included in the subset of possible movements so that the mobile robot can be caused to move, according to one of such trajectories, in a manner that optimizes a relationship between the mobile robot and the challenge, the disclosed technologies are directed to producing the subset of possible movements in a manner that optimizes a diversity of the possible movements included in the subset of possible movements.

A measure of diversity between a first possible movement and a second possible movement can be determined. For example, the measure of diversity can include a difference between a value of a specific parameter, associated with the first possible movement, and a value of the specific parameter associated with the second possible movement. A subset of possible movements can be produced. Measures of diversity associated with possible movements included in the subset can be larger than measures of diversity associated with possible movements excluded from the subset.

For example, in a situation in which a current trajectory of the mobile robot is within a lane of a road and the challenge is an object along the current trajectory, the set of possible movements can include: (1) a reduction of a speed of the mobile robot to match a speed of the object, (2) a change of a direction of the mobile robot to a first different lane of the road, (3) a change of a direction of the mobile robot to a second different lane of the road, and (4) a change of a direction of the mobile robot to a different road.

Optimizing the diversity of the possible movements included in the subset of possible movements can increase a probability that the trajectories associated with the possible movements included in the subset will include a trajectory that can cause the mobile robot to move in the manner that optimizes the relationship between the mobile robot and the challenge. So, for example, if a difference between: (1) a value of a specific parameter, associated with the change of the direction of the mobile robot to the first different lane of the road and (2) a value of the specific parameter associated with the change of the direction of the mobile robot to the second different lane of the road is small, then one of: (1) the change of the direction of the mobile robot to the first different lane of the road and (2) the change of the direction of the mobile robot to the second different lane of the road may be excluded from the subset of possible movements because if a trajectory associated with the change of the direction of the mobile robot to the first different lane of the road is not the trajectory that can cause the mobile robot to move in the manner that optimizes the relationship between the mobile robot and the challenge, then the probability is low that a trajectory associated with the change of the direction of the mobile robot to the second different lane of the road will be the trajectory that can cause the mobile robot to move in the manner that optimizes the relationship between the mobile robot and the challenge.

FIG. 1 includes a diagram that illustrates an example of an environment 100 for producing a trajectory from a diverse set of possible movements, according to the disclosed technologies. For example, the environment 100 can include a first road 102 (disposed along a line of longitude), a second road 104 (disposed along a line of latitude), a third road 106 (disposed along a line of latitude, south of the second road 104), and a fourth road 108 (disposed along a line of longitude, east of the first road 102). For example, a first crossroads intersection 110 can be formed by the first road 102 and the second road 104. For example, the third road 106 can form a T junction intersection 112 at the first road 102. For example, a second crossroads intersection 114 can be formed by the third road 106 and the fourth road 108. For example, a third crossroads intersection 116 can be formed by the second road 104 and the fourth road 108. For example, a distance between the first crossroads intersection 110 and the third crossroads intersection 116 can be 200 meters. For example, a distance between the T junction intersection 112 and the second crossroads intersection 114 can be 200 meters.

For example, the first road 102 can include a right northbound lane 118a, a center northbound lane 118b, and a left northbound lane 118c. For example, a width of each of the right northbound lane 118a, the center northbound lane 118b, and the left northbound lane 118c can be four meters. For example, the left northbound lane 118c can end fifty meters north of the first crossroads intersection 110. For example, the second road 104 can include a westbound lane 120 and an eastbound lane 122. For example, a width of each of the westbound lane 120 and the eastbound lane 122 can be four meters. For example, the third road 106 can include a westbound lane 124 and an eastbound lane 126. For example, a width of each of the westbound lane 124 and the eastbound lane 126 can be four meters. For example, the fourth road 108 can include a southbound lane 128 and a northbound lane 130. For example, a width of each of the southbound lane 128 and the northbound lane 130 can be four meters.

For example, a crosswalk 132 can be disposed across the first road 102 south of the first crossroads intersection 110. For example, a post and beam cantilever 134 can be disposed at a southeast corner of the first crossroads intersection 110. For example, the post and beam cantilever 134 can support a right traffic light 134a, a center traffic light 134b, and a left traffic light 134c. For example, the post and beam cantilever 134 can support a roadside unit 136. For example, a stop sign 138 can be disposed at a southwest corner of the second crossroads intersection 114.

For example, a first vehicle 140 can be stopped at a location in the right northbound lane 118a south of the crosswalk 132. For example, the first vehicle 140 can be a semi-trailer-tractor truck having a length of ten meters. For example, a second vehicle 142 can be at a location in the right northbound lane 118a fifty meters from the T junction intersection 112 and one hundred meters behind the first vehicle 140. For example, the second vehicle 142 can have a processor 144, a memory 146, a sensor 148, and a wireless communications device 150. For example, a westbound pedestrian 152 can be located in the crosswalk 132 in the center northbound lane 118b. For example, an eastbound pedestrian 154 can be located in the crosswalk 132 in the center northbound lane 118b.

Figure 2:
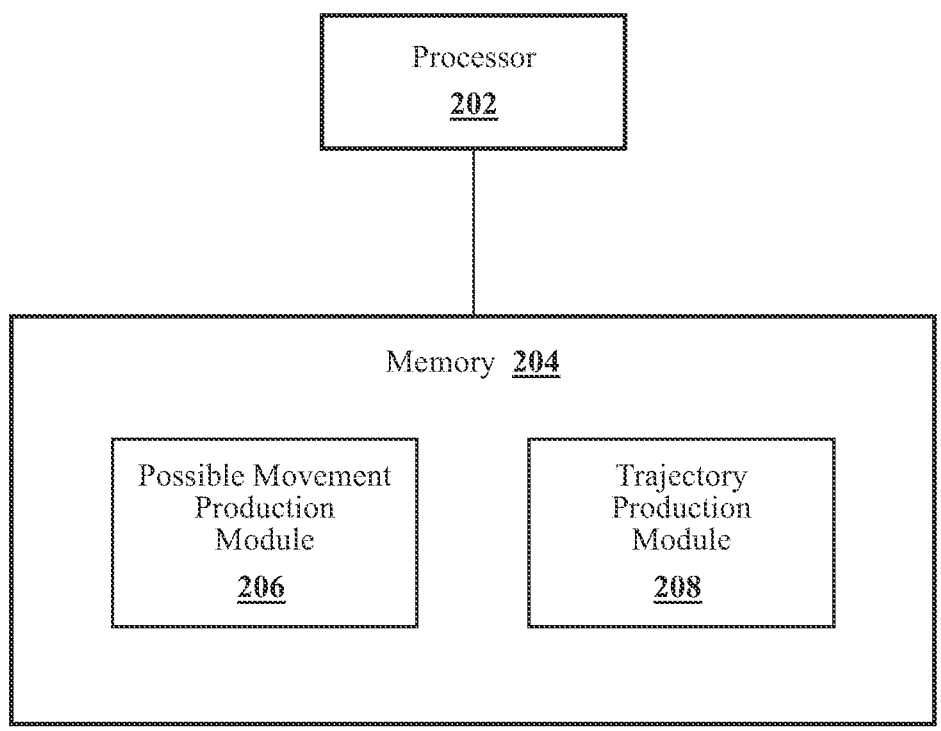
FIG. 2 includes a block diagram that illustrates an example of a system for producing a trajectory from a diverse set of possible movements, according to the disclosed technologies.

FIG. 2 includes a block diagram that illustrates an example of a system 200 for producing a trajectory from a diverse set of possible movements, according to the disclosed technologies. The system 200 can include, for example, a processor 202 and a memory 204. The memory 204 can be communicably coupled to the processor 202. The memory 204 can store, for example, a possible movement production module 206 and a trajectory production module 208. For example, the processor 202 and the memory 204 can be configured to be disposed on a mobile robot. For example, the mobile robot can include an automated vehicle.

For example, the possible movement production module 206 can include instructions that function to control the processor 202 to produce a set of possible movements of a mobile robot with respect to a challenge. For example, a possible movement can include general information about a possible path of travel of the mobile robot.

With reference to FIG. 1, for example, the mobile robot can include the second vehicle 142, the processor 202 can include the processor 144, and the memory 204 can include the memory 146. For example, a current trajectory of the second vehicle 142 can be within the right northbound lane 118a of the first road 102. For example, the challenge can include the first vehicle 140. For example, the sensor 148 can detect information about the first vehicle 140. For example, the set of possible movements can include: (1) a first possible movement 156, (2) a second possible movement 158, (3) a third possible movement 160, and (4) a fourth possible movement 162. The first possible movement 156 can include a reduction of a speed of the second vehicle 142 to match a speed of the first vehicle 140 (e.g., zero meters per minute because the first vehicle 140 can be stopped at the location in the right northbound lane 118a of the first road 102 south of the crosswalk 132). The second possible movement 158 can include a change of a direction of the second vehicle 142 from the right northbound lane 118a of the first road 102 to the center northbound lane 118b of the first road 102. The third possible movement 160 can include: (a) a change of a direction of the second vehicle 142 from the right northbound lane 118a of the first road 102 to the left northbound lane 118c of the first road 102, (b) having the second vehicle 142 cross the first crossroads intersection 110, and (c) a change of a direction of the second vehicle 142 from the left northbound lane 118c of the first road 102 to the center northbound lane 118b of the first road 102 (e.g., because the left northbound lane 118c ends fifty meters north of the first crossroads intersection 110). The fourth possible movement 162 can include a change of a direction of the second vehicle 142 from the left northbound lane 118c of the first road 102 to the eastbound lane 126 of the third road 106.

For example, the challenge can be a physical impediment. The physical impediment can be capable of having an effect on a trajectory of the mobile robot. For example, the physical impediment can include one or more of a stationary object, a moving object, an end of a lane, or the like. For example, with respect to the first possible movement 156, the challenge can include the first vehicle 140. For example, with respect to the second possible movement 158, the challenge can include: (1) the westbound pedestrian 152 located in the crosswalk 132 in the center northbound lane 118b of the first road 102 and (2) the eastbound pedestrian 154 located in the crosswalk 132 in the center northbound lane 118b of the first road 102. For example, with respect to the third possible movement 160, the challenge can include an end of the left northbound lane 118c of the first road 102 fifty meters north of the first crossroads intersection 110.

Additionally or alternatively, for example, the challenge can be an object configured to have an effect on a trajectory of the mobile robot. For example, such an object can include one or more of a traffic light, a traffic sign, a roadside unit, or the like. For example, with respect to the first possible movement 156, the challenge can include the right traffic light 134a. For example, with respect to the second possible movement 158, the challenge can include the center traffic light 134b. For example, with respect to the third possible movement 160, the challenge can include the left traffic light 134c. For example, with respect to the fourth possible movement 162, the challenge can include the stop sign 138. For example, the challenge can include information transmitted by the roadside unit 136. For example, the information transmitted by the roadside unit 136 can include information about traffic (not illustrated) on the first road 102 downstream of the first crossroads intersection 110. For example, the wireless communications device 150 can receive the information transmitted by the roadside unit 136.

Additionally or alternatively, for example, the challenge can include a set of challenges. For example, the set of challenges can include a first challenge and a second challenge. For example, the first challenge can be a physical impediment. The physical impediment can be capable of having a first effect on a trajectory of the mobile robot. For example, the second challenge can be an object configured to have a second effect on the trajectory of the mobile robot. For example, with respect to the first possible movement 156: (1) the first challenge can include the first vehicle 140 and (2) the second challenge can include the right traffic light 134*a*. For example, with respect to the second possible movement 158: (1) the first challenge can include: (a) the westbound pedestrian 152 located in the crosswalk 132 in the center northbound lane 118*b* of the first road 102 and (b) the eastbound pedestrian 154 located in the crosswalk 132 in the center northbound lane 118*b* of the first road 102 and (2) the second challenge can include the center traffic light 134*b*. For example, with respect to the third possible movement 160: (1) the first challenge can include the end of the left northbound lane 118*c* of the first road 102 fifty meters north of the first crossroads intersection 110 and (2) the second challenge can include the left traffic light 134*c*.

For example, a possible movement can be defined by one or more parameters. For example, a parameter can include: (1) a degree of a change of a direction of the mobile robot, (2) a rate of the change of the direction, (3) a distance to a commencement of the change of the direction, (4) a duration of time until the commencement of the change of the direction, (5) a distance to a completion of the change of the direction, (6) a duration of time until the completion of the change of the direction, (7) a count of changes of directions, (8) a magnitude of a change of a speed of the mobile robot, (9) a rate of the change of the speed, (10) a distance to a commencement of the change of the speed, (11) a duration of time until the commencement of the change of the speed, (12) a distance to a completion of the change of the speed, (13) a duration of time until the completion of the speed, (14) a count of changes of speeds, or (15) the like.

FIG. 3 includes a chart 300 that illustrates an example of values for parameters that define possible movements for a set of the possible movements illustrated in FIG. 1, according to the disclosed technologies.

Returning to FIG. 2, for example, the possible movement production module 206 can include instructions that function to control the processor 202 to determine a measure of diversity between a first possible movement and a second possible movement. For example, the instructions to determine the measure of diversity can include instructions to determine, for each pair of possible movements included in the set, the measure of diversity. For example, each of the first possible movement and the second possible movement can be defined by a specific parameter. The instructions to determine the measure of diversity can include instructions to determine a difference. The difference can be between a value of the specific parameter, associated with the first possible movement, and a value of the specific parameter associated with the second possible movement.

FIG. 4 includes a first chart 402 and a second chart 404 that illustrate examples of measures of diversity between pairs of possible movements of the possible movements illustrated in FIG. 1, according to the disclosed technologies.

With reference to FIGS. 1, 3, and 4, the first chart 402 illustrates examples of measures of diversity between pairs of possible movements as defined by values for the degree of the change of the direction of the mobile robot. For example, the degree of the change of the direction of the mobile robot for: (1) the first possible movement 156 can be zero degrees, (2) the second possible movement 158 can be 30 degrees, (3) the third possible movement 160 can be 30 degrees, and (4) the fourth possible movement 162 can be 90 degrees. Accordingly, a measure of diversity between: (1) the first possible movement 156 and the second possible movement 158 can be 30 degrees, (2) the first possible movement 156 and the third possible movement 160 can be 30 degrees, (3) the first possible movement 156 and the fourth possible movement 162 can be 90 degrees, (4) the second possible movement 158 and the third possible movement 160 can be zero degrees, (5) the second possible movement 158 and the fourth possible movement 162 can be 60 degrees, and (6) the third possible movement 160 and the fourth possible movement 162 can be 60 degrees.

The second chart 404 illustrates examples of measures of diversity between pairs of possible movements as defined by values for the magnitude of the change of the speed of the mobile robot. For example, the magnitude of the change of the speed of the mobile robot for: (1) the first possible movement 156 can be 800 meters per minute, (2) the second possible movement 158 can be 200 meters per minute, (3) the third possible movement 160 can be 200 meters per minute, and (4) the fourth possible movement 162 can be 600 meters per minute. Accordingly, a measure of diversity between: (1) the first possible movement 156 and the second possible movement 158 can be 600 meters per minute, (2) the first possible movement 156 and the third possible movement 160 can be 600 meters per minute, (3) the first possible movement 156 and the fourth possible movement 162 can be 200 meters per minute, (4) the second possible movement 158 and the third possible movement 160 can be zero meters per minute, (5) the second possible movement 158 and the fourth possible movement 162 can be 400 meters per minute, and (6) the third possible movement 160 and the fourth possible movement 162 can be 400 meters per minute.

Additionally or alternatively, for example, the specific parameter can include a set of specific parameters. For example, the set of specific parameters can include a first specific parameter and a second specific parameter. The instructions to determine the measure of diversity can include instructions to: (1) determine a first difference, (2) determine a second difference, and (3) combine the first difference and the second difference. The first difference can be between a value of the first specific parameter, associated with the first possible movement, and a value of the first specific parameter associated with the second possible movement. The second difference can be between a value of the second specific parameter, associated with the first possible movement, and a value of the second specific parameter associated with the second possible movement. For example, the first difference can be combined with the second difference by adding the first difference to the second difference. For example, the instructions to determine the measure of diversity can further include instructions to: (1) multiply the first difference by a first weight and (2) multiply the second difference by a second weight. For example, a weighted first difference can be combined with a weighted second difference by adding the weighted first difference to the weighted second difference.

For example: (1) the first specific parameter can be the degree of the change of the direction of the mobile robot and (2) the second specific parameter can be the magnitude of the change of the speed of the mobile robot. For example, the measure of diversity between: (1) the first possible movement 156 and the second possible movement 158 can be a combination of: (a) 30 degrees and (b) 800 meters per minute, (2) the first possible movement 156 and the third possible movement 160 can be a combination of: (a) 30 degrees and (b) 200 meters per minute, (3) the first possible movement 156 and the fourth possible movement 162 can be a combination of: (a) 90 degrees and (b) 200 meters per minute, (4) the second possible movement 158 and the third possible movement 160 can be a combination of: (a) zero degrees and (b) zero meters per minute, (5) the second possible movement 158 and the fourth possible movement 162 can be a combination of: (a) 60 degrees and (b) 400 meters per minute, and (6) the third possible movement 160 and the fourth possible movement 162 can be a combination of: (a) 60 degrees and (b) 400 meters per minute.

For example, if: (1) the instructions to determine the measure of diversity include instructions to: (a) multiply the first difference by a first weight and (b) multiply the second difference by a second weight, (2) the first weight is seven diversity units per degree, and (3) the second weight is two diversity units per meter per minute, then the measure of diversity between: (1) the first possible movement 156 and the second possible movement 158 can be 1,410 diversity units, (2) the first possible movement 156 and the third possible movement 160 can be 1,410 diversity units, (3) the first possible movement 156 and the fourth possible movement 162 can be 1,030 diversity units, (4) the second possible movement 158 and the third possible movement 160 can be zero diversity units, (5) the second possible movement 158 and the fourth possible movement 162 can be 1,220 diversity units, and (6) the third possible movement 160 and the fourth possible movement 162 can be 1,220 diversity units.

For example, a total measure of diversity associated with a corresponding possible movement can be a sum of measures of diversity in which the corresponding possible movement is included. For example, the total measure of diversity associated with: (1) the first possible movement 156 can be 3,850 diversity units, a sum of 1,410 diversity units, 1,410 diversity units, and 1,030 diversity units; (2) the second possible movement 158 can be 2,630 diversity units, a sum of 1,410 diversity units, zero diversity units, and 1,220 diversity units; (3) the third possible movement 160 can be 2,630 diversity units, a sum of 1,410 diversity units, zero diversity units, and 1,220 diversity units; and (4) the fourth possible movement 162 can be 3,470 diversity units, a sum of 1,030 diversity units, 1,220 diversity units, and 1,220 diversity units.

Returning to FIG. 2, for example, the possible movement production module 206 can include instructions that function to control the processor 202 to produce a subset of the set of possible movements. Measures of diversity associated with possible movements included in the subset can be larger than measures of diversity associated with possible movements excluded from the subset. For example, the instructions to produce the subset can include instructions to produce the subset so that a count of the possible movements included in the subset is less than or equal to a threshold count.

With reference to FIG. 1, for example, if: (1) the threshold count is two and (2) the total measure of diversity associated with: (a) the first possible movement 156 is 3,850 diversity units, (b) the second possible movement 158 is 2,630 diversity units, (c) the third possible movement 160 is 2,630 diversity units, and (d) the fourth possible movement 162 is 3,470 diversity units, then the subset can include the first possible movement 156 and the fourth possible movement 162 because the measures of diversity associated with the first possible movement 156 and the fourth possible movement 162 are larger than the measures of diversity associated with the second possible movement 158 and the third possible movement 160.

Returning to FIG. 2, for example, the trajectory production module 208 can include instructions that function to control the processor 202 to produce trajectories associated with the possible movements included in the subset.

For example, the trajectory production module 208 can include instructions that function to control the processor 202 to cause the mobile robot to move according to one of the trajectories.

For example, the threshold count can be associated with a duration of time. The duration of time can be an interval of time within which operations, to produce trajectories associated with the possible movements included in the subset, are capable of being completed by the processor 202 before a time at which a commencement of a movement of the mobile robot with respect to the challenge is needed.

For example, the possible movement production module 206 can further include instructions to determine the threshold count. For example, the instructions to determine the threshold count can include instructions to determine, based on one or more factors, the threshold count.

For example, a factor, of the one or more factors, can include: (1) in a situation in which the challenge is a set of challenges, a count of challenges in the set of challenges, (2) a measure of a complexity of one or more challenges in the set of challenges, (3) one or more measures of complexity, or (4) the like. A measure of complexity, of the one or more measures of complexity, can be of operations associated with a corresponding possible movement of the set of movements.

With reference to FIG. 1, for example: (1) the first possible movement 156 can include a set of two challenges: (a) the first vehicle 140 and (b) the right traffic light 134a; (2) the second possible movement 158 can include a set of three challenges: (a) the westbound pedestrian 152 located in the crosswalk 132 in the center northbound lane 118b of the first road 102, (b) the eastbound pedestrian 154 located in the crosswalk 132 in the center northbound lane 118b of the first road 102, and (c) the center traffic light 134b; (3) the third possible movement 160 can include a set of two challenges: (a) the end of the left northbound lane 118c of the first road 102 fifty meters north of the first crossroads intersection 110 and (b) the left traffic light 134c; and (4) the fourth possible movement 162 can include a set of one challenge: the stop sign 138.

For example, because the set of challenges associated with the second possible movement 158 includes two challenges that involve physical impediments, (1) the westbound pedestrian 152 located in the crosswalk 132 in the center northbound lane 118b of the first road 102 and (2) the eastbound pedestrian 154 located in the crosswalk 132 in the center northbound lane 118b of the first road 102, these two challenges can be considered to have a high measure of complexity.

For example, because the set of challenges associated with each of: (1) the first possible movement 156 (i.e., (a) the first vehicle 140 and (b) the right traffic light 134a) (2) the second possible movement 158 (i.e., (a) the westbound pedestrian 152 located in the crosswalk 132 in the center northbound lane 118b of the first road 102, (b) the eastbound pedestrian 154 located in the crosswalk 132 in the center northbound lane 118b of the first road 102, and (c) the center traffic light 134b), and (3) the third possible movement 160 (i.e., (a) the end of the left northbound lane 118c of the first road 102 fifty meters north of the first crossroads intersection 110 and (b) the left traffic light 134c) includes a challenge that involves a physical impediment and a challenge that involves an object configured to have an effect on a trajectory of the mobile robot, the set of challenges associated with each of the first possible movement 156, the second possible movement 158, and (3) the third possible movement 160 can be associated with one or more measures of complexity.

For example, a measure of complexity associated with each of the right traffic light 134a, the center traffic light 134b, and the left traffic light 134c can be based on a probability of a change in a state of the traffic light during a corresponding possible movement. Alternatively, a measure of complexity associated with each of the right traffic light 134a, the center traffic light 134b, and the left traffic light 134c can be based on information, received by the wireless communications device 150, about a duration of time until a change in a state of the traffic light during a corresponding possible movement.

Returning to FIG. 2, additionally or alternatively, for example, a factor, of the one or more factors, can include: (1) an operating frequency of the processor 202, (2) a measure of an available capacity of the memory 204 being used by the processor 202 to execute operations, (3) a count of the operations (e.g., for other applications) being executed by the processor 202 concurrently with operations to determine the threshold count, (4) a measure of a complexity of one or more of the operations being executed by the processor 202 concurrently with the operations to determine the threshold count, or (5) the like.

Additionally or alternatively, for example, a factor, of the one or more factors, can include: (1) a distance between the challenge and the mobile robot, (2) a duration of time until the mobile robot, moving according to a current trajectory of the mobile robot, is at a location of the challenge, or (3) the like.

With reference to FIG. 1, for example, for: (1) the first possible movement 156, the distance between the second vehicle 142 and the first vehicle 140 can be one hundred meters; (2) the second possible movement 158, the distance between the second vehicle 142 and: (a) the westbound pedestrian 152 located in the crosswalk 132 in the center northbound lane 118b and (b) the eastbound pedestrian 154 located in the crosswalk 132 in the center northbound lane 118b can be 64 meters; (3) the third possible movement 160, the distance between the second vehicle 142 and the end of the left northbound lane 118c of the first road 102 can be 126 meters; and (4) the fourth possible movement 162, the distance between the second vehicle 142 and the stop sign 138 can be 250 meters.

For example, the duration of time until the second vehicle 142, moving according to: (1) the first possible movement 156, is at a location of the first vehicle 140, can be 15 seconds; (2) the second possible movement 158, is at a location of: (a) the westbound pedestrian 152 located in the crosswalk 132 in the center northbound lane 118b and (b) the eastbound pedestrian 154 located in the crosswalk 132 in the center northbound lane 118b can be 20 seconds; (3) the third possible movement 160, is at a location of the end of the left northbound lane 118c of the first road 102 can be 37 seconds; and (4) the fourth possible movement 162, is at a location of the end of the stop sign 138 can be 34 seconds.

Figure 5:
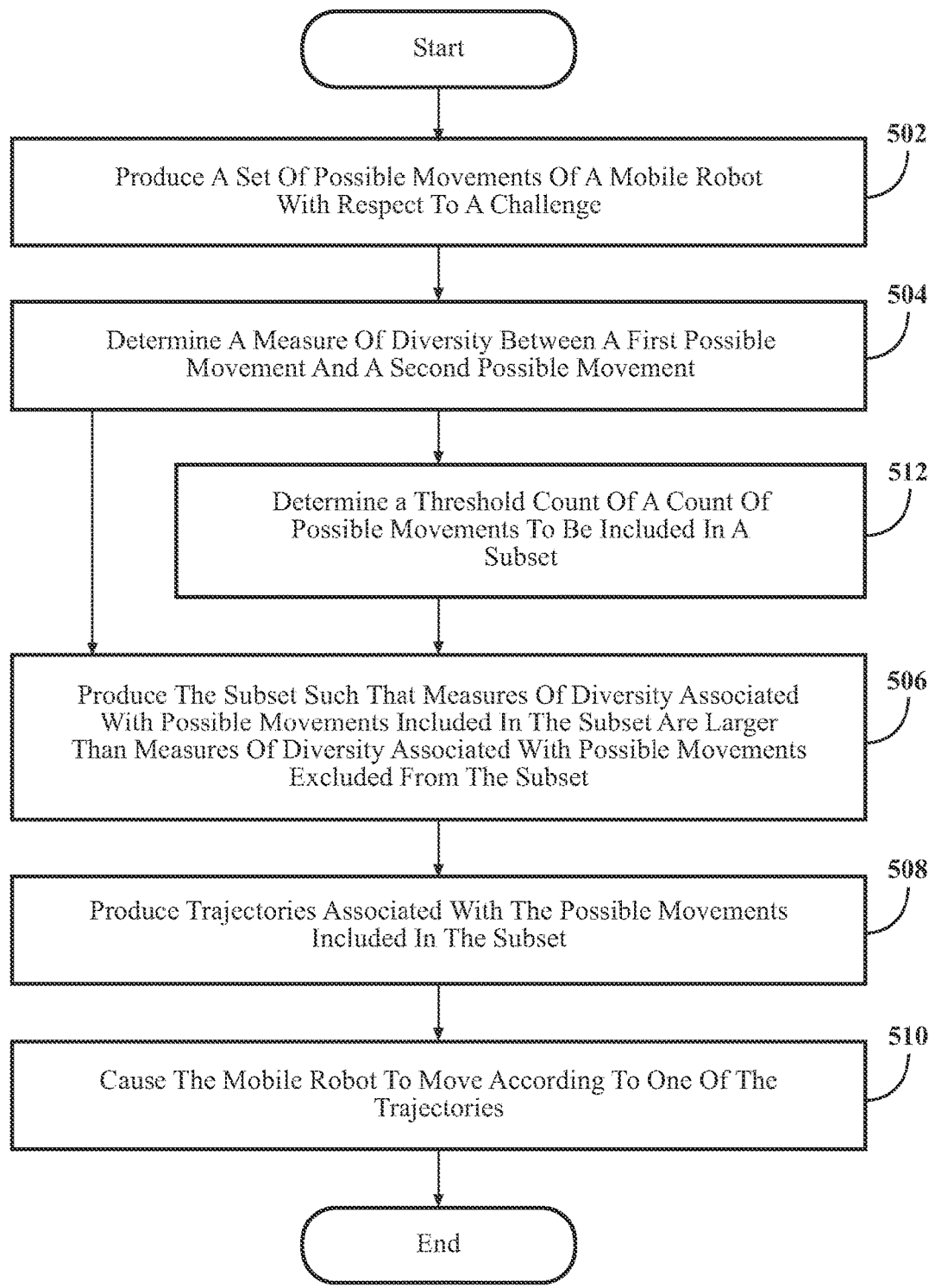
FIG. 5 includes a flow diagram that illustrates an example of a method that is associated with producing a trajectory from a diverse set of possible movements, according to the disclosed technologies.

FIG. 5 includes a flow diagram that illustrates an example of a method 500 that is associated with producing a trajectory from a diverse set of possible movements, according to the disclosed technologies. Although the method 500 is described in combination with the system 200 illustrated in FIG. 2, one of skill in the art understands, in light of the description herein, that the method 500 is not limited to being implemented by the system 200 illustrated in FIG. 2. Rather, the system 200 illustrated in FIG. 2 is an example of a system that may be used to implement the method 500. Additionally, although the method 500 is illustrated as a generally serial process, various aspects of the method 500 may be able to be executed in parallel. For example, operations of the method 500 can be performed by a mobile robot. For example, the mobile robot can include an automated vehicle.

In FIG. 5, in the method 500, at an operation 502, for example, the possible movement production module 206 can produce a set of possible movements of a mobile robot with respect to a challenge. For example, a possible movement can include general information about a possible path of travel of the mobile robot.

For example, the challenge can be a physical impediment. The physical impediment can be capable of having an effect on a trajectory of the mobile robot. For example, the physical impediment can include one or more of a stationary object, a moving object, an end of a lane, or the like.

Additionally or alternatively, for example, the challenge can be an object configured to have an effect on a trajectory of the mobile robot. For example, such an object can include one or more of a traffic light, a traffic sign, a roadside unit, or the like.

Additionally or alternatively, for example, the challenge can include a set of challenges. For example, the set of challenges can include a first challenge and a second challenge. For example, the first challenge can be a physical impediment. The physical impediment can be capable of having a first effect on a trajectory of the mobile robot. For example, the second challenge can be an object configured to have a second effect on the trajectory of the mobile robot.

For example, a possible movement can be defined by one or more parameters. For example, a parameter can include: (1) a degree of a change of a direction of the mobile robot, (2) a rate of the change of the direction, (3) a distance to a commencement of the change of the direction, (4) a duration of time until the commencement of the change of the direction, (5) a distance to a completion of the change of the direction, (6) a duration of time until the completion of the change of the direction, (7) a count of changes of directions, (8) a magnitude of a change of a speed of the mobile robot, (9) a rate of the change of the speed, (10) a distance to a commencement of the change of the speed, (11) a duration of time until the commencement of the change of the speed, (12) a distance to a completion of the change of the speed, (13) a duration of time until the completion of the change of the speed, (14) a count of changes of speeds, or (15) the like.

At an operation 504, for example, the possible movement production module 206 can determine a measure of diversity between a first possible movement and a second possible movement. For example, the operation 504 can determine, for each pair of possible movements included in the set, the measure of diversity. For example, each of the first possible movement and the second possible movement can be defined by a specific parameter. The operation 504 can determine a difference. The difference can be between a value of the specific parameter, associated with the first possible movement, and a value of the specific parameter associated with the second possible movement.

Additionally or alternatively, for example, the specific parameter can include a set of specific parameters. For example, the set of specific parameters can include a first specific parameter and a second specific parameter. The operation 504 can: (1) determine a first difference, (2) determine a second difference, and (3) combine the first difference and the second difference. The first difference can be between a value of the first specific parameter, associated with the first possible movement, and a value of the first specific parameter associated with the second possible movement. The second difference can be between a value of the second specific parameter, associated with the first possible movement, and a value of the second specific parameter associated with the second possible movement. For example, the first difference can be combined with the second difference by adding the first difference to the second difference. For example, the operation 504 can: (1) multiply the first difference by a first weight and (2) multiply the second difference by a second weight. For example, the operation 504 can combine a weighted first difference with a weighted second difference by adding the weighted first difference to the weighted second difference. For example, a total measure of diversity associated with a corresponding possible movement can be a sum of measures of diversity in which the corresponding possible movement is included.

At an operation 506, for example, the possible movement production module 206 can produce a subset of the set of possible movements. Measures of diversity associated with possible movements included in the subset can be larger than measures of diversity associated with possible movements excluded from the subset. For example, the operation 506 can produce the subset so that a count of the possible movements included in the subset is less than or equal to a threshold count.

At an operation 508, for example, the trajectory production module 208 can produce trajectories associated with the possible movements included in the subset.

At an operation 510, for example, the trajectory production module 208 can cause the mobile robot to move according to one of the trajectories.

For example, the threshold count can be associated with a duration of time. The duration of time can be an interval of time within which operations, to produce trajectories associated with the possible movements included in the subset, are capable of being completed by the processor 202 before a time at which a commencement of a movement of the mobile robot with respect to the challenge is needed.

For example, at an operation 512, the possible movement production module 206 can determine the threshold count. For example, the operation 512 can determine, based on one or more factors, the threshold count.

For example, a factor, of the one or more factors, can include: (1) in a situation in which the challenge is a set of challenges, a count of challenges in the set of challenges, (2) a measure of a complexity of one or more challenges in the set of challenges, (3) one or more measures of complexity, or (4) the like. A measure of complexity, of the one or more measures of complexity, can be of operations associated with a corresponding possible movement of the set of movements.

Additionally or alternatively, for example, a factor, of the one or more factors, can include: (1) an operating frequency of the processor 202, (2) a measure of an available capacity of the memory 204 being used by the processor 202 to execute operations, (3) a count of the operations (e.g., for other applications) being executed by the processor 202 concurrently with operations to determine the threshold count, (4) a measure of a complexity of one or more of the operations being executed by the processor 202 concurrently with the operations to determine the threshold count, or (5) the like.

Additionally or alternatively, for example, a factor, of the one or more factors, can include: (1) a distance between the challenge and the mobile robot, (2) a duration of time until the mobile robot, moving according to a current trajectory of the mobile robot, is at a location of the challenge, or (3) the like.

Figure 6:
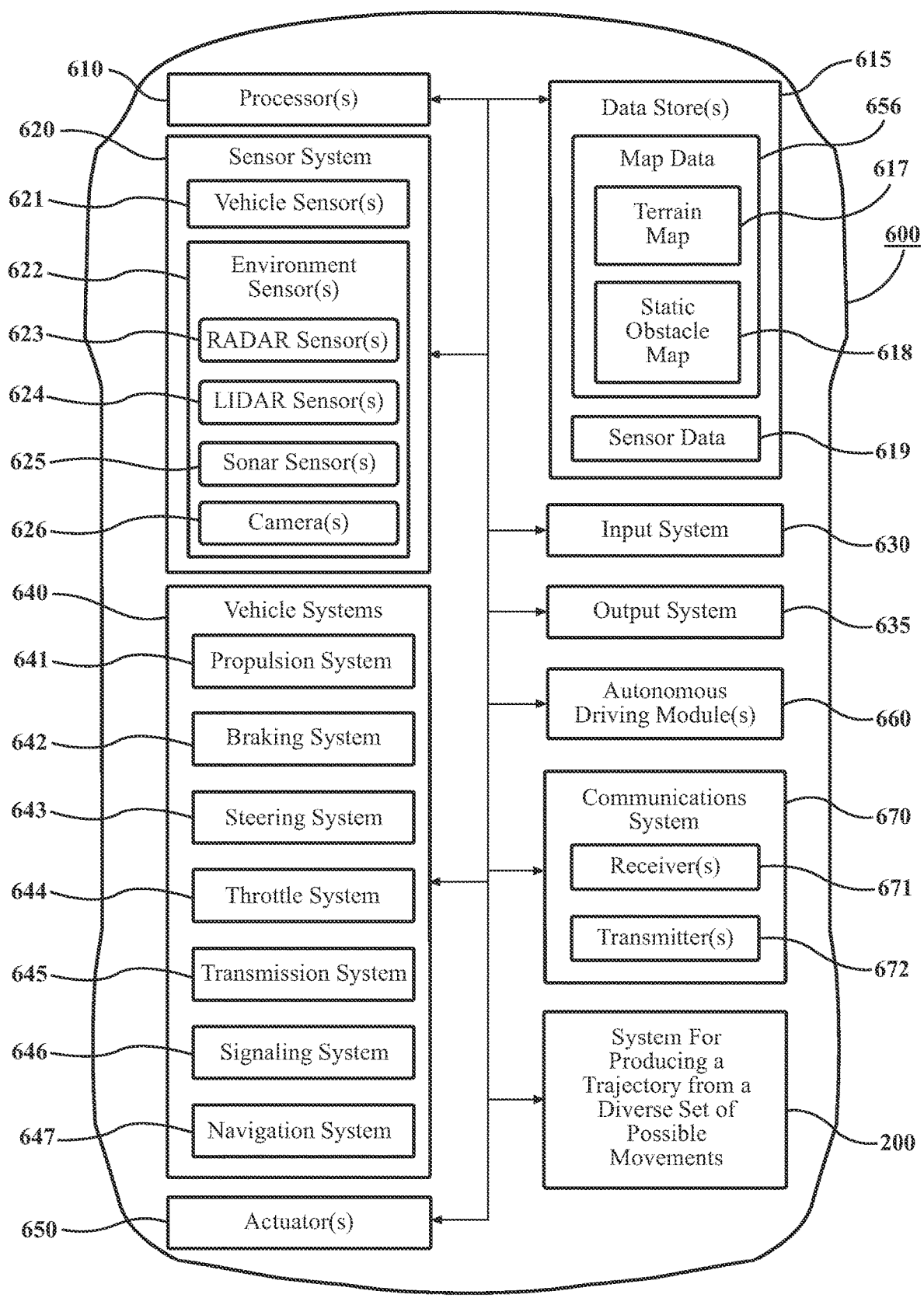
FIG. 6 includes a block diagram that illustrates an example of elements disposed on a vehicle, according to the disclosed technologies.

FIG. 6 includes a block diagram that illustrates an example of elements disposed on a vehicle 600, according to the disclosed technologies. As used herein, a "vehicle" can be any form of powered transport. In one or more implementations, the vehicle 600 can be an automobile. While arrangements described herein are with respect to automobiles, one of skill in the art understands, in light of the description herein, that embodiments are not limited to automobiles. For example, functions and/or operations of the second vehicle 142 (illustrated in FIG. 1) can be realized by the vehicle 600.

In some embodiments, the vehicle 600 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 600 is performed according to inputs received from a user (e.g., human driver). In one or more arrangements, the vehicle 600 can be a conventional vehicle that is configured to operate in only a manual mode.

In one or more embodiments, the vehicle 600 can be an automated vehicle. As used herein, "automated vehicle" can refer to a vehicle that operates in an automated mode. As used herein, "automated mode" can refer to navigating and/or maneuvering the vehicle 600 along a travel route using one or more computing systems to control the vehicle 600 with minimal or no input from a human driver. In one or more embodiments, the vehicle 600 can be highly automated or completely automated. In one embodiment, the vehicle 600 can be configured with one or more semi-automated operational modes in which one or more computing systems perform a portion of the navigation and/or maneuvering of the vehicle along a travel route, and a vehicle operator (i.e., driver) provides inputs to the vehicle 600 to perform a portion of the navigation and/or maneuvering of the vehicle 600 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 600 can include various elements. The vehicle 600 can have any combination of the various elements illustrated in FIG. 6. In various embodiments, it may not be necessary for the vehicle 600 to include all of the elements illustrated in FIG. 6. Furthermore, the vehicle 600 can have elements in addition to those illustrated in FIG. 6. While the various elements are illustrated in FIG. 6 as being located within the vehicle 600, one or more of these elements can be located external to the vehicle 600. Furthermore, the elements illustrated may be physically separated by large distances. For example, as described, one or more components of the disclosed system can be implemented within the vehicle 600 while other components of the system can be implemented within a cloud-computing environment, as described below. For example, the elements can include one or more processors 610, one or more data stores 615, a sensor system 620, an input system 630, an output system 635, vehicle systems 640, one or more actuators 650, one or more automated driving modules 660, a communications system 670, and the system 200 for producing a trajectory from a diverse set of possible movements.

In one or more arrangements, the one or more processors 610 can be a main processor of the vehicle 600. For example, the one or more processors 610 can be an electronic control unit (ECU). For example, functions and/or operations of the processor 144 (illustrated in FIG. 1) and/or functions and/or operations of the processor 202 (illustrated in FIG. 2) can be realized by the one or more processors 610.

The one or more data stores 615 can store, for example, one or more types of data. The one or more data stores 615 can include volatile memory and/or non-volatile memory. For example, functions and/or operations of the memory 146 (illustrated in FIG. 1) and/or functions and/or operations of the memory 204 (illustrated in FIG. 2) can be realized by the one or more data stores 615. Examples of suitable memory for the one or more data stores 615 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 615 can be a component of the one or more processors 610. Additionally or alternatively, the one or more data stores 615 can be operatively connected to the one or more processors 610 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 615 can store map data 616. The map data 616 can include maps of one or more geographic areas. In some instances, the map data 616 can include information or data on roads, traffic control devices, road markings, structures, features, and/or landmarks in the one or more geographic areas. The map data 616 can be in any suitable form. In some instances, the map data 616 can include aerial views of an area. In some instances, the map data 616 can include ground views of an area, including 360-degree ground views. The map data 616 can include measurements, dimensions, distances, and/or information for one or more items included in the map data 616 and/or relative to other items included in the map data 616. The map data 616 can include a digital map with information about road geometry. The map data 616 can be high quality and/or highly detailed.

In one or more arrangements, the map data 616 can include one or more terrain maps 617. The one or more terrain maps 617 can include information about the ground, terrain, roads, surfaces, and/or other features of one or more geographic areas. The one or more terrain maps 617 can include elevation data of the one or more geographic areas. The map data 616 can be high quality and/or highly detailed. The one or more terrain maps 617 can define one or more ground surfaces, which can include paved roads, unpaved roads, land, and other things that define a ground surface.

In one or more arrangements, the map data 616 can include one or more static obstacle maps 618. The one or more static obstacle maps 618 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 618 can have location data, size data, dimension data, material data, and/or other data associated with them. The one or more static obstacle maps 618 can include measurements, dimensions, distances, and/or information for one or more static obstacles. The one or more static obstacle maps 618 can be high quality and/or highly detailed. The one or more static obstacle maps 618 can be updated to reflect changes within a mapped area.

In one or more arrangements, the one or more data stores 615 can store sensor data 619. As used herein, "sensor data" can refer to any information about the sensors with which the vehicle 600 can be equipped including the capabilities of and other information about such sensors. The sensor data 619 can relate to one or more sensors of the sensor system 620. For example, in one or more arrangements, the sensor data 619 can include information about one or more lidar sensors 624 of the sensor system 620.

In some arrangements, at least a portion of the map data 616 and/or the sensor data 619 can be located in one or more data stores 615 that are located onboard the vehicle 600. Alternatively or additionally, at least a portion of the map data 616 and/or the sensor data 619 can be located in one or more data stores 615 that are located remotely from the vehicle 600.

The sensor system 620 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 620 includes a plurality of sensors, the sensors can work independently from each other. Alternatively, two or more of the sensors can work in combination with each other. In such a case, the two or more sensors can form a sensor network. The sensor system 620 and/or the one or more sensors can be operatively connected to the one or more processors 610, the one or more data stores 615, and/or another element of the vehicle 600 (including any of the elements illustrated in FIG. 6). The sensor system 620 can acquire data of at least a portion of the external environment of the vehicle 600 (e.g., nearby vehicles). The sensor system 620 can include any suitable type of sensor. Various examples of different types of sensors are described herein. However, one of skill in the art understands that the embodiments are not limited to the particular sensors described herein.

The sensor system 620 can include one or more vehicle sensors 621. The one or more vehicle sensors 621 can detect, determine, and/or sense information about the vehicle 600 itself. In one or more arrangements, the one or more vehicle sensors 621 can be configured to detect and/or sense position and orientation changes of the vehicle 600 such as, for example, based on inertial acceleration. In one or more arrangements, the one or more vehicle sensors 621 can include one or more accelerometers, one or more gyroscopes, an inertial measurement unit (IMU), a dead-reckoning system, a global navigation satellite system (GNSS), a global positioning system (GPS), a navigation system 647, and/or other suitable sensors. The one or more vehicle sensors 621 can be configured to detect and/or sense one or more characteristics of the vehicle 600. In one or more arrangements, the one or more vehicle sensors 621 can include a speedometer to determine a current speed of the vehicle 600.

Alternatively or additionally, the sensor system 620 can include one or more environment sensors 622 configured to acquire and/or sense driving environment data. As used herein, "driving environment data" can include data or information about the external environment in which a vehicle is located or one or more portions thereof. For example, the one or more environment sensors 622 can be configured to detect, quantify, and/or sense obstacles in at least a portion of the external environment of the vehicle 600 and/or information/data about such obstacles. Such obstacles may be stationary objects and/or dynamic objects. The one or more environment sensors 622 can be configured to detect, measure, quantify, and/or sense other things in the external environment of the vehicle 600 such as, for example, lane markers, signs, traffic lights, traffic signs, lane lines, crosswalks, curbs proximate the vehicle 600, off-road objects, etc. For example, functions and/or operations of the sensor 148 (illustrated in FIG. 1) can be realized by the one or more environment sensors 622.

Various examples of sensors of the sensor system 620 are described herein. The example sensors may be part of the one or more vehicle sensors 621 and/or the one or more environment sensors 622. However, one of skill in the art understands that the embodiments are not limited to the particular sensors described.

In one or more arrangements, the one or more environment sensors 622 can include one or more radar sensors 623, one or more lidar sensors 624, one or more sonar sensors 625, and/or one more cameras 626. In one or more arrangements, the one or more cameras 626 can be one or more high dynamic range (HDR) cameras or one or more infrared (IR) cameras. For example, the one or more cameras 626 can be used to record a reality of a state of an item of information that can appear in the digital map.

The input system 630 can include any device, component, system, element, arrangement, or groups thereof that enable information/data to be entered into a machine. The input system 630 can receive an input from a vehicle passenger (e.g., a driver or a passenger). The output system 635 can include any device, component, system, element, arrangement, or groups thereof that enable information/data to be presented to a vehicle passenger (e.g., a driver or a passenger).

Various examples of the one or more vehicle systems 640 are illustrated in FIG. 6. However, one of skill in the art understands that the vehicle 600 can include more, fewer, or different vehicle systems. Although particular vehicle systems can be separately defined, each or any of the systems or portions thereof may be otherwise combined or segregated via hardware and/or software within the vehicle 600. For example, the one or more vehicle systems 640 can include a propulsion system 641, a braking system 642, a steering system 643, a throttle system 644, a transmission system 645, a signaling system 646, and/or the navigation system 647. Each of these systems can include one or more devices, components, and/or a combination thereof, now known or later developed.

The navigation system 647 can include one or more devices, applications, and/or combinations thereof, now known or later developed, configured to determine the geographic location of the vehicle 600 and/or to determine a travel route for the vehicle 600. The navigation system 647 can include one or more mapping applications to determine a travel route for the vehicle 600. The navigation system 647 can include a global positioning system, a local positioning system, a geolocation system, and/or a combination thereof.

The one or more actuators 650 can be any element or combination of elements operable to modify, adjust, and/or alter one or more of the vehicle systems 640 or components thereof responsive to receiving signals or other inputs from the one or more processors 610 and/or the one or more automated driving modules 660. Any suitable actuator can be used. For example, the one or more actuators 650 can include motors, pneumatic actuators, hydraulic pistons, relays, solenoids, and/or piezoelectric actuators.

The one or more processors 610 and/or the one or more automated driving modules 660 can be operatively connected to communicate with the various vehicle systems 640 and/or individual components thereof. For example, the one or more processors 610 and/or the one or more automated driving modules 660 can be in communication to send and/or receive information from the various vehicle systems 640 to control the movement, speed, maneuvering, heading, direction, etc. of the vehicle 600. The one or more processors 610 and/or the one or more automated driving modules 660 may control some or all of these vehicle systems 640 and, thus, may be partially or fully automated.

The one or more processors 610 and/or the one or more automated driving modules 660 may be operable to control the navigation and/or maneuvering of the vehicle 600 by controlling one or more of the vehicle systems 640 and/or components thereof. For example, when operating in an automated mode, the one or more processors 610 and/or the one or more automated driving modules 660 can control the direction and/or speed of the vehicle 600. The one or more processors 610 and/or the one or more automated driving modules 660 can cause the vehicle 600 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 670 can include one or more receivers 671 and/or one or more transmitters 672. The communications system 670 can receive and transmit one or more messages through one or more wireless communications channels. For example, functions and/or operations of the wireless communications device 150 (illustrated in FIG. 1) can be realized by the communications system 670. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 670 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 610, the one or more data stores 615, and the communications system 670 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 600 can include one or more modules, at least some of which are described herein. The modules can be implemented as computer-readable program code that, when executed by the one or more processors 610, implement one or more of the various processes described herein. One or more of the modules can be a component of the one or more processors 610. Alternatively or additionally, one or more of the modules can be executed on and/or distributed among other processing systems to which the one or more processors 610 can be operatively connected. The modules can include instructions (e.g., program logic) executable by the one or more processors 610. Alternatively or additionally, the one or more data store 615 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 600 can include one or more automated driving modules 660. The one or more automated driving modules 660 can be configured to receive data from the sensor system 620 and/or any other type of system capable of capturing information relating to the vehicle 600 and/or the external environment of the vehicle 600. In one or more arrangements, the one or more automated driving modules 660 can use such data to generate one or more driving scene models. The one or more automated driving modules 660 can determine position and velocity of the vehicle 600. The one or more automated driving modules 660 can determine the location of obstacles, obstacles, or other environmental features including traffic signs, trees, shrubs, neighboring vehicles, pedestrians, etc.

The one or more automated driving modules 660 can be configured to receive and/or determine location information for obstacles within the external environment of the vehicle 600 for use by the one or more processors 610 and/or one or more of the modules described herein to estimate position and orientation of the vehicle 600, vehicle position in global coordinates based on signals from a plurality of satellites, or any other data and/or signals that could be used to determine the current state of the vehicle 600 or determine the position of the vehicle 600 with respect to its environment for use in either creating a map or determining the position of the vehicle 600 in respect to map data.

The one or more automated driving modules 660 can be configured to determine one or more travel paths, current automated driving maneuvers for the vehicle 600, future automated driving maneuvers and/or modifications to current automated driving maneuvers based on data acquired by the sensor system 620, driving scene models, and/or data from any other suitable source such as determinations from the sensor data 619. As used herein, "driving maneuver" can refer to one or more actions that affect the movement of a vehicle. Examples of driving maneuvers include: accelerating, decelerating, braking, turning, moving in a lateral direction of the vehicle 600, changing travel lanes, merging into a travel lane, and/or reversing, just to name a few possibilities. The one or more automated driving modules 660 can be configured to implement determined driving maneuvers. The one or more automated driving modules 660 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 660 can be configured to execute various vehicle functions and/or to transmit data to, receive data from, interact with, and/or control the vehicle 600 or one or more systems thereof (e.g., one or more of vehicle systems 640). For example, functions and/or operations of an automotive navigation system can be realized by the one or more automated driving modules 660.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-6, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for producing a trajectory from a diverse set of possible movements, comprising:
   a mobile robot configured to move in response to a receipt of a control signal;
   a processor; and
   a memory storing:
      a possible movement production module including instruction that, when executed by the processor, cause the processor to:
         produce a set of possible movements of the mobile robot with respect to a challenge, wherein each possible movement, of the set of possible movements, lacks information about a discretized representation about a sequence of points, per unit of time or unit of space, along a possible path of travel of the mobile robot;

determine a measure of diversity between a value of a specific parameter of a first possible movement and a value of the specific parameter of a second possible movement; and produce a subset, measures of diversity associated with possible movements included in the subset being larger than measures of diversity associated with possible movements excluded from the subset, wherein a count of the possible movements included in the subset is less than or equal to a threshold; and a trajectory production module including instruction that, when executed by the processor, cause the processor to:

produce trajectories associated with the possible movements included in the subset so that a production of the trajectories is completed before a time at which a commencement of a movement is needed, wherein a trajectory, of the trajectories, includes the information about the discretized representation about the sequence of points along the possible path of travel; and cause the control signal to be sent to the mobile robot to move according to a trajectory, of the trajectories, that optimizes a relationship between the mobile robot and the challenge.

2. The system of claim 1, wherein the mobile robot comprises an automated vehicle.

3. The system of claim 1, wherein the challenge is a physical impediment, the physical impediment being capable of having an effect on a trajectory of the mobile robot.

4. The system of claim 3, wherein the physical impediment comprises at least one of a stationary object, a moving object, or an end of a lane.

5. The system of claim 1, wherein the challenge is an object, the object being configured to have an effect on a trajectory of the mobile robot.

6. The system of claim 5, wherein the object comprises at least one of a traffic light, a traffic sign, or a roadside unit.

7. The system of claim 1, wherein:
the challenge comprises a first challenge and a second challenge,
the first challenge is a physical impediment, the physical impediment being capable of having a first effect on a trajectory of the mobile robot, and
the second challenge is an object configured to have a second effect on the trajectory of the mobile robot.

8. The system of claim 1, wherein the instructions to determine the measure of diversity include instructions to determine, for each pair of possible movements included in the set, the measure of diversity.

9. The system of claim 1, wherein:
each of the first possible movement and the second possible movement is defined by the specific parameter, and
the instructions to determine the measure of diversity include instructions to determine a difference, the difference being between the value of the specific parameter, associated with the first possible movement, and the value of the specific parameter associated with the second possible movement.

10. The system of claim 9, wherein:
the specific parameter comprises a first specific parameter and a second specific parameter, and
the instructions to determine the measure of diversity include instructions to:
determine a first difference, the first difference being between a value of the first specific parameter, associated with the first possible movement, and a value of the first specific parameter associated with the second possible movement;
determine a second difference, the second difference being between a value of the second specific parameter, associated with the first possible movement, and a value of the second specific parameter associated with the second possible movement; and
combine the first difference and the second difference.

11. The system of claim 10, wherein the instructions to determine the measure of diversity further include instructions to:
multiply the first difference by a first weight; and
multiply the second difference by a second weight.

12. The system of claim 1, wherein the threshold count is associated with a duration of time, the duration of time being an interval of time within which operations, to produce the trajectories associated with the possible movements included in the subset, are capable of being completed by the processor before a time at which a commencement of a movement of the mobile robot with respect to the challenge is needed.

13. The system of claim 1, wherein the possible movement production module further includes instructions to determine the threshold count.

14. The system of claim 13, wherein the instructions to determine the threshold count include instructions to determine, based on at least one factor, the threshold count, wherein a factor, of the at least one factor, comprises:
in a situation in which the challenge is a set of challenges, a count of challenges in the set of challenges,
a measure of a complexity of at least one challenge in the set of challenges, or
at least one measure of complexity, wherein a measure of complexity, of the at least one measure of complexity, is of operations associated with a corresponding possible movement of the set of movements.

15. The system of claim 13, wherein the instructions to determine the threshold count include instructions to determine, based on at least one factor, the threshold count, wherein a factor, of the at least one factor, comprises:
an operating frequency of the processor,
a measure of an available capacity of the memory being used by the processor to execute operations,
a count of the operations being executed by the processor concurrently with operations to determine the threshold count, or
a measure of a complexity of at least one of the operations being executed by the processor concurrently with the operations to determine the threshold count.

16. The system of claim 13, wherein the instructions to determine the threshold count include instructions to determine, based on at least one factor, the threshold count, wherein a factor, of the at least one factor, comprises:
a distance between the challenge and the mobile robot, or
a duration of time until the mobile robot, moving according to a current trajectory of the mobile robot, is at a location of the challenge.

17. The system of claim 14, wherein the at least one measure of complexity is based on a probability of a change in a state of a traffic light.

18. A method for producing a trajectory from a diverse set of possible movements, comprising:
producing, by a processor, a set of possible movements of a mobile robot with respect to a challenge, wherein each possible movement, of the set of possible movements, lacks information about a discretized representation about a sequence of points, per unit of time or unit of space, along a possible path of travel of the mobile robot;
determining, by the processor, a measure of diversity between a value of a specific parameter of a first possible movement and a value of the specific parameter of a second possible movement;
producing, by the processor, a subset, measures of diversity associated with possible movements included in the subset being larger than measures of diversity associated with possible movements excluded from the subset, wherein a count of the possible movements included in the subset is less than or equal to a threshold;
producing, by the processor, trajectories associated with the possible movements included in the subset so that a production of the trajectories is completed before a time at which a commencement of a movement is needed, wherein a trajectory, of the trajectories, includes the information about the discretized representation about the sequence of points along the possible path of travel;
causing, by the processor, a control signal to be sent to the mobile robot to move according to a trajectory, of the trajectories, that optimizes a relationship between the mobile robot and the challenge; and
moving, in response to a receipt of the control signal, the mobile robot.

19. The method of claim 18, wherein a possible movement, of the set of possible movements, is defined by at least one parameter, a parameter, of the at least one parameter, comprising:
a degree of a change of a direction of the mobile robot,
a rate of the change of the direction,
a distance to a commencement of the change of the direction,
a duration of time until the commencement of the change of the direction,
a distance to a completion of the change of the direction,
a duration of time until the completion of the change of the direction,
a count of changes of directions,
a magnitude of a change of a speed of the mobile robot,
a rate of the change of the speed,
a distance to a commencement of the change of the speed,
a duration of time until the commencement of the change of the speed,
a distance to a completion of the change of the speed,
a duration of time until the completion of the change of the speed, or
a count of changes of speeds.

20. A system for producing a trajectory from a diverse set of possible movements, comprising:
a mobile robot configured to move in response to a receipt of a control signal;
a processor; and
a memory storing a module including instructions that cause the processor to:
produce a set of possible movements, each possible movement lacking information about a discretized representation about a sequence of points, per unit of time or unit of space, along a possible travel path of a mobile robot with respect to a challenge;
produce trajectories associated with the possible movements included in a subset of the set so that a production of the trajectories is completed before a time at which a commencement of a movement is needed, a count of the possible movements included in the subset being less than or equal to a threshold, wherein:
diversity measures of possible movements included in the subset are larger than diversity measures of possible movements excluded from the subset, and
a trajectory includes the information about the discretized representation about the sequence of points along the possible path of travel; and
cause the control signal to be sent to the mobile robot to move according to a trajectory that optimizes a relationship between the mobile robot and the challenge.

21. A system for producing a trajectory from a diverse set of possible movements, comprising:
a processor; and
a memory storing a module including instructions that cause the processor to:
produce a set of possible movements, each possible movement lacking information about a discretized representation about a sequence of points, per unit of time or unit of space, along a possible travel path of a mobile robot with respect to a challenge;
produce trajectories associated with the possible movements included in a subset of the set so that a production of the trajectories is completed before a time at which a commencement of a movement is needed, a count of the possible movements included in the subset being less than or equal to a threshold, wherein:
diversity measures of possible movements included in the subset are larger than diversity measures of possible movements excluded from the subset, and
a trajectory includes the information about the discretized representation about the sequence of points along the possible path of travel; and
cause the mobile robot to move, according to a trajectory that optimizes a relationship between the mobile robot and the challenge, by changing at least one of a direction or a speed.

* * * * *